United States Patent Office 3,122,521
Patented Feb. 25, 1964

3,122,521
METHOD OF POLYMERIZING FLUOROALKYL-SUBSTITUTED CYCLOTRISILOXANES
Ogden R. Pierce, Midland, Mich., assignor to Dow Corning Corporation, Midland, Mich., a corporation of Michigan
No Drawing. Filed Mar. 18, 1960, Ser. No. 15,813
6 Claims. (Cl. 260—46.5)

This invention relates to the use of α-alkali metal substituted carboxylic acid esters as catalysts for the polymerization of fluoroalkyl organocyclotrisiloxanes.

The preparation of polymers composed of units of the formula

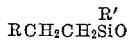

in which each R is a perfluoroalkyl radical of from 1 to 10 carbon atoms and each R' is a methyl or vinyl radical and up to 10 mol percent units of the formula R''''$_2$SiO in which each R'''' is a methyl, phenyl or vinyl radical was achieved by heating the respective homopolymeric cyclotrisiloxanes in contact with alkali metal hydroxides, quaternary ammonium hydroxides and organosilicon salts of these hydroxides as described in copending application Serial No. 808,952, filed April 27, 1959, by Oscar Johannson. This invention is intended to provide a similar method employing a new class of catalysts.

This invention relates to a method which comprises heating cyclotrisiloxanes of the formula

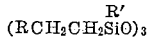

in which each R is a perfluoroalkyl radical of from 1 to 10 carbon atoms and each R' is a radical selected from the group consisting of the methyl, ethyl and vinyl radicals in contact with a catalyst selected from the group consisting of compounds of the formulae R''$_2$CXCOOX,

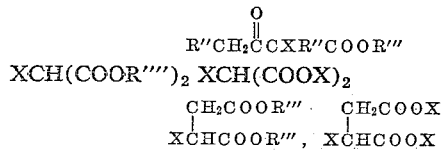

(CHXCOOR'''')$_2$ and (CHXCOOX)$_2$, in which each R'' is selected from the group consisting of hydrogen and monovalent hydrocarbon radicals of less than seven carbon atoms, each R'''' is an alkyl radical of less than six carbon atoms and each X is an alkali metal atom, said catalyst being present in an amount such that there is from 0.5 to 1000 alkali metal atoms alpha to a carbonyl group per 100,000 silicon atoms, at a temperature and for a time sufficient to cause polymerization of the cyclotrisiloxanes to the desired polymer without causing appreciable degradation of the polymer so formed.

The method described in the above-identified Johannson application takes advantage of the fact that the cyclic trimers in the presence of the claimed catalysts open and polymerize to high linear polymers at a rate substantially faster than that at which the linear polymers break down to cyclic polysiloxanes of at least four siloxane units. The method of the instant invention likewise takes advantage of these phenomena. The optimum temperature and time for any particular cyclotrisiloxane must be determined for each system. In general, the more rapid the polymerization of the cyclic trisiloxane the lower the temperature and the shorter the time necessary to give the desired high polymer. If the optimum temperature for a very reactive siloxane is grossly exceeded, the rate of depolymerization will be so great the siloxane may be polymerized and degraded all in a matter of a few minutes. Furthermore, if the optimum time at any particular temperature is grossly exceeded, the polymer formed will be degraded to cyclics.

In general the polymerization of the cyclosiloxanes of this invention can be carried out at temperatures ranging from 30° C. to 250° C. or higher for times varying from 5 minutes to 3 days.

Another factor which affects the rate of the reaction is the alkalinity of the catalyst. For any given cyclic siloxane more rapid polymerization takes place under given conditions of temperature with a more alkaline catalyst. Thus the higher the temperature and the stronger the catalyst the more rapid will be the polymerization. The lower the temperature and the weaker the catalyst the longer the polymerization will take.

The cyclotrisiloxanes which are within the scope of this invention include any cyclotrisiloxane in which R' is methyl, ethyl or vinyl and in which R is any perfluoroalkyl radical of from 1 to 10 carbon atoms such as CF$_3$, C$_2$F$_5$, C$_3$F$_7$, C$_7$F$_{15}$ and C$_{10}$F$_{21}$. These perfluoroalkyl radicals can be either straight or branched chain radicals. Thus it can be seen that specific examples of cyclotrisiloxanes within the scope of this invention are

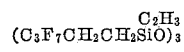

and

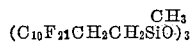

It should be understood that any of the above cyclosiloxanes can be polymerized either alone to give homopolymers or two or more of the cyclosiloxanes can be copolymerized to give copolymers.

The fluorinated alkyl cyclic siloxanes employed in the method of this invention are best prepared by the methods described in the copending application of Ogden R. Pierce and George W. Holbrook, Serial No. 594,108, filed June 27, 1956, now U.S. Patent 2,972,519. Briefly the cyclic siloxanes may be prepared by the series of steps of reacting olefins of the formula RCH=CH$_2$ with silanes of the formula R''SiHCl$_2$ in the presence of a platinum catalyst under conventional conditions and thereafter hydrolyzing the adduct to a siloxane and then heating the siloxane in the presence of an alkali metal hydroxide under conditions causing the cyclotrisiloxanes of this invention to distill from the reaction vessel.

An alternative method involves reacting compounds of the formula RCH$_2$CH$_2$Br with magnesium in diethylether under conventional conditions to give the corresponding Grignard reagent which can then be coupled with silanes of the formula R'SiX$_3$ where X is a halogen atom or an alkoxy group. This method is particularly advantageous where R' is the vinyl radical. The resulting chlorosilanes or alkoxysilanes are hydrolyzed and cracked to the cyclic trisiloxane as above indicated.

If desired, the cyclotrisiloxanes of this invention can be copolymerized with up to 10 mol percent cyclosiloxanes of the formula (R''''$_2$SiO)$_3$ in which R'''' is the methyl, phenyl or vinyl radical as is shown in the copending application Serial No. 594,113, filed June 27, 1956, by Eric D. Brown and entitled "Low Swell High Temperature Organosiloxane Rubbers." Thus, for example, the cyclotrisiloxanes of this invention can be copolymerized with limited amounts of hexamethylcyclotrisiloxane, trimethyltrivinylcyclotrisiloxane, monovinylpentamethylcyclotrisiloxane, triphenyltrimethylcyclotrisiloxane, or hexaphenylcyclotrisiloxane. The preparation of such copolymers containing up to 10 mol percent of R''''$_2$SiO units is considered to be within the scope of this invention.

The catalysts employed in the method of this invention are esters and salts of certain carboxylic acids. These carboxylic acids contain a carbon atom alpha to, i.e. attached directly to, at least one carbonyl carbon. At least one of said alpha carbon atoms in any molecule of catalyst has an alkali metal atom attached thereto. An alkali metal atom attached to one of these alpha carbon atoms is referred to as an alpha alkali metal atom.

More specifically, the catalysts employed in this invention are compounds of the formulae $R''_2CXCOOX$, $$R''CH_2\overset{O}{\overset{\|}{C}}CXR'''COOR'''$$

$XCH(COOR''')_2$, $XCH(COOX)_2$, $$X\overset{COOR'''}{\overset{|}{C}}HCH_2COOR'''$$

$$X\overset{COOX}{\overset{|}{C}}HCH_2COOX$$

$(CHXCOOR''')_2$ and $(CHXCOOX)_2$, in which each $R''$ is hydrogen or a monovalent hydrocarbon radical, each $R'''$ is an alkyl radical of less than six carbon atoms and each X is an alkali metal atom. For example, each $R''$ can be hydrogen, an alkyl radical such as the methyl, ethyl, isopropyl, t-butyl, isoamyl or n-hexyl radical, an alkenyl radical such as the vinyl, allyl or butadienyl radical, a cycloaliphatic radical such as the cyclohexenyl or cyclopentyl radical or the phenyl radical. Each $R'''$ can be, for example, the methyl, ethyl, isopropyl, t-butyl or amyl radical. Each X can be, for example, a sodium atom, a potassium atom, a lithium atom or a like alkali metal atom.

Typical catalysts for the method of this invention include, for example, such materials as $NaCH_2COONa$, $KC(CH_3)(C_2H_5)COOK$,

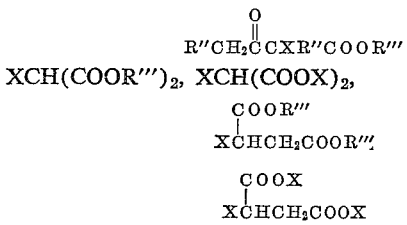

$$CH_3CH(CH_3)CH_2CH_2\overset{Na}{\overset{|}{C}}HCOOK, \quad CH_2=\overset{K}{\overset{|}{C}}HCHCOONa$$

$$CH_3CH_2\overset{Na}{\overset{|}{C}}(CH_3)COONa$$

$KCH(COOC_2H_5)_2$, $NaCH(COOC_2H_5)_2$,

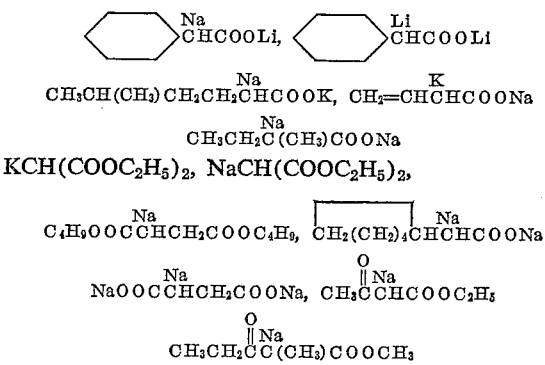

$(CHNaCOONa)_2$ and $(CHNaCOOC_3H_7)_2$.

The preparation of these materials is well known. The compounds of the formula $R''_2CXCOOX$ are best prepared by the reaction of an acid salt $R''_2CHCOOX$ with a stoichiometric amount of an alkali metal amide at a temperature between about 170 and 250° C. in a system flushed with nitrogen as shown in U.S. Patent 2,918,494, "Production of Organometallic Compounds," issued December 22, 1959. The alpha alkali metal derivatives of acetoacetic ester and the like are best prepared by the reaction of an alkali metal, e.g. sodium, or alkali metal amide, e.g. sodium amide, with a suitable carboxylic acid ester. The alpha alkali metal derivatives of malonic ester and the like are best prepared by the reaction of the ester with an alkali metal alkoxide, e.g. sodium ethoxide. These last two reactions are illustrated in "The Chemistry of Organic Compounds," by Conant and Blatt, 4th ed., The MacMillan Company (1952), pages 259 to 271 at pages 266 to 269. The alpha alkali metal derivatives of the alkali metal salts of malonic acid and the like are best prepared by reacting the salt with the desired alkali metal amide by the method described in the above-named patent. Preparations are simplified when all the $R'''$ radicals are identical in a given catalytic compound and all X atoms are identical in a given catalytic compound.

The amount of catalyst employed is not critical and may range from 1 alpha alkali metal atom per 100 silicon atoms to 1 alpha alkali metal atom per 200,000 silicon atoms or from 0.5 to 1000 alpha alkali metal atoms per 100,000 silicon atoms.

If desired, the polymerizations of this invention can be carried out in the presence of limited amounts of solvent. This is an unexpected result since it has heretofore been shown that ordinarily the presence of solvents tends to reduce the molecular weight of the polymers obtained during alkaline polymerization. One exception to this is the nitrogen-containing solvents shown in U.S. Patent 2,634,284. With the materials of this invention, however, high polymers can be obtained even in the presence of hydrocarbon solvents such as toluene, xylene and the like or ethers such as dibutylether.

The process of this invention is particularly suitable for preparing rubber grade base polymers of the type disclosed and claimed in the aforesaid copending Brown application. Such rubbers as shown in the Brown case combine exceptionally low swell in aromatic solvents with excellent thermal stability and excellent stress strain properties. Furthermore, the method of this invention imparts to the Brown rubbers through the polymers produced a notable improvement in tear strength as well as occasional improvement in tensile strength over rubbers prepared from polymers polymerized with other catalysts.

The following examples are illustrative only and are not to be construed as limiting the invention which is properly delineated in the appended claims. All proportions not otherwise defined are described in parts by weight.

EXAMPLE 1

78 grams (0.5 mol) of $[CF_3CH_2CH_2Si(CH_3)O]_3$ and 0.0172 gram (0.002 mol) of $[(CH_3)(C_2H_3)SiO]_3$ were mixed and heated to 150° C. 0.0073 grams of α-sodio sodium acetate (equivalent to one α-sodium per 10,000 silicon atoms) was added to the mixture and the resulting system was heated at 150° C. for one hour producing a copolymer A of about 0.4 mol percent methylvinylsiloxane units and 99.6 mol percent 3,3,3-trifluoropropylmethylsiloxane units, said copolymer having a Williams plasticity of about 0.250 inch.

100 parts by weight of copolymer A were incorporated into a standard rubber stock formulation by milling with 20 parts of a fume silica, 10 parts of a silica xerogel, 5 parts of a hydroxy-endblocked dimethylpolysiloxane containing 3.7 percent silicon-bonded hydroxyl groups, 1 part of ferric oxide and 1 part of benzoyl peroxide. The resulting stock was press-molded and vulcanized for 5 minutes at 125° C. and 5000 p.s.i. and samples were then oven-cured for 24 hours at 150 and 250° C. respectively. The durometer D, tensile strength T (p.s.i.) and percent elongation at break E were measured.

*Table I*

| Cure | D | T | E |
|---|---|---|---|
| As molded | 41 | 1,630 | 550 |
| 24 hr. at 150° C | 57 | 1,770 | 340 |
| 24 hr. at 250° C | 55 | 1,190 | 350 |

EXAMPLE 2

183.4 grams (1.24 moles) of $[CF_3CH_2CH_2Si(CH_3)O]_3$ and 0.602 gram (0.007 mol) of $[(CH_3)(C_2H_3)SiO]_3$ were mixed and heated to 150° C. To this mixture was added 0.002 gram of α-sodio sodium acetate (equivalent to one α-sodium per 80,000 silicon atoms). The resulting mixture was heated for 4 hours at 150° C. producing a copolymer B of 0.56 mol percent methylvinyl-siloxane units and 99.44 mol percent 3,3,3-trifluoropropylmethylsiloxane units, said copolymer having a Williams plasticity of about 0.250 inch.

Copolymer B was substituted for the polymer of Example 1 in the rubber stock formulation described therein. The resulting rubber had about the same physical properties as those shown in Table I.

EXAMPLE 3

140.5 grams (0.894 mol) of $[CF_3CH_2CH_2Si(CH_3)O]_3$ and 0.344 gram (0.004 mol) of $[(CH_3)(C_2H_3)SiO]_3$ were mixed and heated to 150° C. To this mixture was added 0.0197 gram of α-sodio sodium acetate (equivalent to one α-sodium per 5000 silicon atoms), and the mixture was heated for 1 hour at 150° C. The resulting product was a copolymer C of 0.446 mol percent methylvinylsiloxane units and 99.554 mol percent 3,3,3-trifluoropropylmethylsiloxane units, said copolymer having a Williams plasticity of about 0.250 inch.

100 parts by weight of copolymer C were mixed with 30 parts of a fume silica, 15 parts of a silica xerogel, 10 parts of a hydroxy-endblocked 3,3,3-trifluoropropylmethylpolysiloxane fluid containing 1.56 percent by weight silicon-bonded hydroxyl groups, 0.28 part of $TiO_2$ and 1 part of bis-2,4-dichlorobenzoyl peroxide. This formulation was vulcanized for 5 minutes at 125° C. at 2000 p.s.i. and oven-cured for 8 hours at 200° C. The durometer D, tensile strength T (p.s.i.), percent elongation at break E and tear strength (pounds per inch) were measured and compared with a commercial stock.

*Table II*

| Polymer | D | T | E | Tear |
|---|---|---|---|---|
| C | 71 | 1,405 | 235 | 117 |
| Commercial | 62 | 1,090 | 203 | 70 |

EXAMPLE 4

When each of $[CF_3CH_2CH_2Si(CH_3)O]_3$ and
$[C_3F_7CH_2CH_2Si(CH_3)O]_3$
are substituted for the cyclic mixture in Example 3, the resulting products are respectively a 3,3,3-trifluoropropylmethylpolysiloxane stiff gum and a 3,3,4,4,5,5,5-heptafluoropentylmethylpolysiloxane stiff gum, each gum producing similar excellent rubbers when employed in the rubber stock formulation in Example 3.

EXAMPLE 5

When a mixture of $[CF_3CH_2CH_2Si(CH_3)O]_3$,
$[CF_3CH_2CH_2Si(C_2H_3)O]_3$
and $[(C_6H_5)(CH_3)SiO]_3$ in a mol ratio of 95:0.5:4.5 is substituted for the cyclic mixture in Example 3, the resulting gum is a copolymer composed approximately of 95 mol percent 3,3,3-trifluoropropylmethylsiloxane units, 4.5 mol percent phenylmethylsiloxane units and 0.5 mol percent 3,3,3-trifluoropropylvinylsiloxane units. When this gum copolymer is employed in the rubber stock formulation in Example 3, similar high tear strength, high tensile strength rubbers are produced.

EXAMPLE 6

When

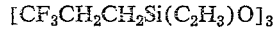

and $(NaCHCOONa)_2$ are each substituted in a ratio of 0.5 mol per mol of $NaCH_2COONa$ in Example 3, similar gum copolymers are produced. When each of these gum copolymers is employed in the rubber stock formulation in Example 3, similar excellent rubbers result.

EXAMPLE 7

75 grams (0.480 mol) of $[CF_3CH_2CH_2Si(CH_3)O]_3$ and 0.172 gram (0.002 mol) of $[(CH_3)(C_2H_3)SiO]_3$ were mixed and heated to 61° C. $NaCH(COOC_2H_5)_2$ was prepared by adding sodium to a solution of malonic ester in the dimethyl ether of ethylene glycol such that there was 1 gram mol of α-sodium per 1390 grams of solution. 0.1343 gram of this α-sodio diethylmalonate solution (equivalent to one α-sodium per 5,000 silicon atoms) was added to the cyclic mixture which was then heated for one hour at about 61° C. The product was a copolymer D of 0.415 mol percent methylvinylsiloxane units and 99.585 mol percent 3,3,3-trifluoropropylmethylsiloxane units, said copolymer having a Williams plasticity of about 0.070 inch.

Copolymer D was substituted for copolymer C in the rubber stock formulation employed in Example 3. After the same vulcanization and cure the durometer, tensile strength, percent elongation at break and tear strength were measured.

*Table III*

| D | T | E | Tear |
|---|---|---|---|
| 80 | 850 | 143 | 103 |

EXAMPLE 8

When

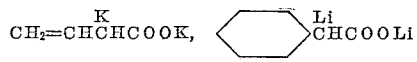

are each substituted mol for mol for the
$NaCH(COOC_2H_5)_2$
in Example 7, each of the resulting gum copolymers when compounded in the rubber stock formulation employed in Example 3 produces a similar good high tear strength rubber.

That which is claimed is:

1. A method which comprises heating cyclotrisiloxanes of the formula

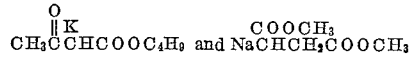

in which each R is a perfluoroalkyl radical of from 1 to 10 carbon atoms and each R' is a radical selected from the group consisting of the methyl, ethyl, and vinyl radicals in contact with a catalyst selected from the group consisting of compounds of the formulae $R''_2CXCOOX$,

$XCH[COOR''']_2$, $XCH[COOX]_2$,

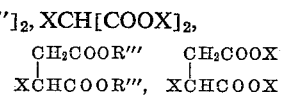

$(CHXCOOR''')_2$ and $(CHXCOOX)_2$, in which each R'' is selected from the group consisting of hydrogen and monovalent hydrocarbon radicals of less than seven carbon atoms, each R''' is an alkyl radical of less than six carbon atoms and each X is an alkali metal atom, said catalyst being present in an amount such that there are from 0.5 to 1000 alkali metal atoms alpha to a carbonyl group per 100,000 silicon atoms, at a temperature and for a time sufficient to cause polymerization of the cyclotrisiloxanes to the desired polymer without causing appreciable degradation of the polymer so formed.

2. A method which comprises heating a mixture of (1) cyclotrisiloxanes of the formula

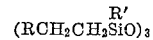

in which each R is a perfluoroalkyl radical of from 1 to 10 carbon atoms and each R' is a radical selected from the group consisting of the methyl, ethyl and vinyl radicals and (2) cyclotrisiloxanes of the formula $(R''''_2SiO)_3$ in which each R'''' is selected from the group consisting of the methyl, phenyl and vinyl radicals, (2) being present in an amount up to 10 mol percent of the mixture, in contact with a catalyst selected from the group consisting of compounds of the formulae $R''_2CXCOOX$,

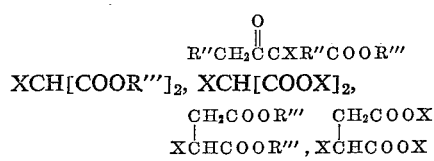

$XCH[COOR''']_2$, $XCH[COOX]_2$, $$X\overset{\underset{|}{CH_2COOR'''}}{C}HCOOR''', X\overset{\underset{|}{CH_2COOX}}{C}HCOOX$$

$(CHXCOOR''')_2$ and $(CHXCOOX)_2$, in which each $R''$ is selected from the group consisting of hydrogen and monovalent hydrocarbon radicals of less than seven carbon atoms, each $R'''$ is an alkyl radical of less than six carbon atoms and each X is an alkali metal atom, said catalyst being present in an amount such that there are from 0.5 to 1000 alkali metal atoms alpha to a carbonyl group per 100,000 silicon atoms, at a temperature and for a time sufficient to cause polymerization of the cyclotrisiloxanes to the desired polymer without causing appreciable degradation of the polymer so formed.

3. The method in accordance with claim 1 wherein $R'$ is a methyl radical and the catalyst is α-sodio sodium acetate.

4. The method in accordance with claim 1 wherein the cyclotrisiloxane is $[CF_3CH_2CH_2Si(CH_3)O]_3$ and the catalyst is α-sodio sodium acetate.

5. The method in accordance with claim 2 wherein cyclotrisiloxane (1) is $[CF_3CH_2CH_2Si(CH_3)O]_3$, cyclotrisiloxane (2) is $[(CH_3)(C_2H_3)SiO]_3$ and the catalyst is α-sodio sodium acetate.

6. The method in accordance with claim 2 wherein cyclotrisiloxane (1) is $[CF_3CH_2CH_2Si(CH_3)O]_3$, cyclotrisiloxane (2) is $[(CH_3)(C_2H_3)SiO]_3$ and the catalyst is $NaCH(COOC_2H_5)_2$.

References Cited in the file of this patent

UNITED STATES PATENTS

| | | |
|---|---|---|
| 2,918,494 | Closson et al. | Dec. 12, 1959 |
| 2,961,425 | Pierce et al. | Nov. 22, 1960 |

OTHER REFERENCES

WADC Technical Report 55–220 Part III ASTIA Document No. AD 31044, Development of Fluoro-Silicone Elastomers Dyckes, September 1957, pages 35–39 and 48–53.

UNITED STATES PATENT OFFICE
CERTIFICATE OF CORRECTION

Patent No. 3,122,521                      February 25, 1964

Ogden R. Pierce

It is hereby certified that error appears in the above numbered patent requiring correction and that the said Letters Patent should read as corrected below.

Column 1, line 41, the left-hand portion of the formula should appear as shown below instead of as in the patent:

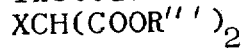

line 45, for "$(CHXCOOR'''')_2$" read -- $(CHXCOOR''')_2$ --; same column 1, line 48, for "$R''''$" read -- $R'''$ --; column 2, line 42, for "$R''SiHCl_2$" read -- $R'SiHCl_2$ --.

Signed and sealed this 8th day of December 1964.

(SEAL)
Attest:

ERNEST W. SWIDER
Attesting Officer

EDWARD J. BRENNER
Commissioner of Patents